(12) United States Patent
Cash

(10) Patent No.: US 11,181,267 B2
(45) Date of Patent: Nov. 23, 2021

(54) REGENERATIVE OXIDIZER ARRANGEMENT

(71) Applicant: DUSTEX LLC, Kennesaw, GA (US)

(72) Inventor: James T. Cash, Hackettstown, NJ (US)

(73) Assignee: Dustex LLC, Kennesaw, GA (US)

(*) Notice: Subject to any disclaimer, the term of this patent is extended or adjusted under 35 U.S.C. 154(b) by 103 days.

(21) Appl. No.: 16/709,516

(22) Filed: Dec. 10, 2019

(65) Prior Publication Data

US 2021/0172599 A1 Jun. 10, 2021

(51) Int. Cl.
| | |
|---|---|
| *F23G 7/06* | (2006.01) |
| *F23L 15/02* | (2006.01) |
| *F27D 17/00* | (2006.01) |
| *F16K 11/085* | (2006.01) |
| *F16K 31/04* | (2006.01) |

(52) U.S. Cl.
CPC ............ *F23G 7/068* (2013.01); *F16K 11/085* (2013.01); *F16K 31/041* (2013.01); *F23L 15/02* (2013.01); *F27D 17/008* (2013.01)

(58) Field of Classification Search
CPC ........ F23G 7/068; F27D 17/008; F23L 15/02; F16K 11/085; F16K 31/041
See application file for complete search history.

(56) References Cited

U.S. PATENT DOCUMENTS

| | | | | | |
|---|---|---|---|---|---|
| 2,898,202 | A | * | 8/1959 | Eriksson | F23G 7/07 |
| | | | | | 422/115 |
| 2,946,651 | A | * | 7/1960 | Houdry | B01D 53/944 |
| | | | | | 423/212 |
| 3,170,678 | A | * | 2/1965 | Keefer | C03B 5/237 |
| | | | | | 432/28 |
| 4,280,416 | A | * | 7/1981 | Edgerton | B01D 53/005 |
| | | | | | 110/254 |
| 5,016,547 | A | * | 5/1991 | Thomason | F23G 7/068 |
| | | | | | 110/210 |
| 5,375,622 | A | * | 12/1994 | Houston | F16K 11/076 |
| | | | | | 137/240 |
| 5,376,340 | A | * | 12/1994 | Bayer | B01D 53/72 |
| | | | | | 110/245 |
| 5,417,927 | A | * | 5/1995 | Houston | F23G 7/068 |
| | | | | | 422/109 |
| 5,460,789 | A | * | 10/1995 | Wilhelm | B01D 53/005 |
| | | | | | 110/204 |

(Continued)

*Primary Examiner* — David Colon-Morales
(74) *Attorney, Agent, or Firm* — Alston & Bird LLP

(57) ABSTRACT

Methods and systems for oxidizing gas are provided. An example regenerative oxidizer is provided that includes a combustion chamber to heat gas present in the combustion chamber. The regenerative oxidizer also includes a first heat exchange media bed and a second heat exchange media bed, each in fluid communication with the combustion chamber. The regenerative oxidizer also includes a rotary valve disposed at least partially between the first heat exchange media bed and the second heat exchange media bed. The rotary valve may alternate the flow of gas between a first and a second airflow direction. The first heat exchange media bed, the rotary valve, and the second heat exchange media bed are arranged with respect to each other such that the gas pathway between the first heat exchange media bed and the rotary valve and between the second heat exchange media bed and the rotary valve is non-linear.

18 Claims, 8 Drawing Sheets

(56) References Cited

U.S. PATENT DOCUMENTS

| | | | | |
|---|---|---|---|---|
| 5,503,551 | A * | 4/1996 | Houston | F23G 7/068 110/212 |
| 5,515,909 | A * | 5/1996 | Tanaka | F16K 11/074 165/4 |
| 5,562,442 | A * | 10/1996 | Wilhelm | F23G 7/068 110/211 |
| 5,589,142 | A * | 12/1996 | Gribbon | F23G 7/07 422/171 |
| 5,692,892 | A * | 12/1997 | Houston | F23G 7/068 432/180 |
| 5,692,893 | A * | 12/1997 | Houston | F23G 7/068 137/309 |
| 5,871,349 | A * | 2/1999 | Johnson | F23G 7/07 432/180 |
| 5,888,063 | A * | 3/1999 | Scott | F23G 7/068 432/181 |
| 5,997,292 | A * | 12/1999 | Tanaka | F28F 19/04 432/181 |
| 6,039,927 | A * | 3/2000 | Greco | F23G 7/068 110/211 |
| 6,193,504 | B1 * | 2/2001 | Chen | B01D 53/864 432/72 |
| 6,298,877 | B1 * | 10/2001 | Inuki | A61B 5/1172 110/211 |
| 6,322,356 | B1 * | 11/2001 | Gupta | F23G 7/07 432/179 |
| 6,423,275 | B1 * | 7/2002 | D'Souza | B08B 1/02 165/4 |
| 6,974,318 | B2 * | 12/2005 | Ahn | F27D 17/004 432/180 |
| 7,017,592 | B2 * | 3/2006 | Chiles | F23G 7/068 134/22.1 |
| 7,150,446 | B1 * | 12/2006 | Cash | F16K 3/10 251/129.11 |
| 7,325,562 | B2 * | 2/2008 | Cash | F16K 25/02 137/311 |
| 7,740,026 | B2 * | 6/2010 | Matsui | F28D 17/02 137/311 |
| 7,766,025 | B2 * | 8/2010 | Greco | F28D 17/04 137/1 |
| 8,535,051 | B2 * | 9/2013 | Greco | F16K 11/0743 431/215 |
| 8,758,693 | B2 * | 6/2014 | Bria | F23G 7/068 422/175 |
| 9,958,155 | B1 * | 5/2018 | Park | F23G 7/068 |
| 2003/0221725 | A1 * | 12/2003 | Greco | F16K 11/0525 137/309 |
| 2005/0139272 | A1 * | 6/2005 | Thornton | F16K 11/076 137/625.46 |
| 2011/0081277 | A1 * | 4/2011 | Balon, Jr. | F23G 7/068 422/175 |

* cited by examiner

REGENERATIVE OXIDIZER ARRANGEMENT

FIELD OF THE INVENTION

The present disclosure relates generally to regenerative oxidizers (e.g., regenerative thermal oxidizers (RTOs) and/or regenerative catalytic oxidizers (RCOs)), and, more particularly, to methods, apparatuses, and systems for improving the operability of regenerative thermal oxidizers.

BACKGROUND

Regenerative thermal oxidizers (RTOs) are used to reduce the amount of pollutants, such as volatile organic compounds and odors, in gas through thermal oxidation. RTOs may include valve assemblies configured to alternate the flow of gas through the RTO during operation. Through applied effort, ingenuity, and innovation, many identified problems have been solved by developing solutions that are included in embodiments of the present disclosure, many examples of which are described in detail herein.

BRIEF SUMMARY

Traditional RTOs may include various types of diverter valve assemblies including poppet valves, butterfly valves, and rotary valves, each with advantages and disadvantages. Poppet valve RTOs and butterfly valve RTOs require multiple valves to operate as desired. The frequency of valve opening and closing during usage, however, creates a strain on poppet valves, and multiple valves present more potential malfunctions. Rotary valves are used in place of other types of valves to reduce the number of moving parts and lower pressure fluctuations during usage. Conventional rotary valves are positioned below heat exchange media beds resulting in at least two issues. First, during cleaning when water is supplied to the heat exchange media beds to allow for the removal of accumulated inorganic contaminants, dirty water traveling down through the rotary valve may damage the valve seal, resulting in leakage and thereby reducing the overall efficiency of the RTO. Second, conventional rotary valves positioned below the heat exchange media beds do not promote optimal gas flow distribution into the media bed above. Said differently, the gas tends to flow upwardly in a straight line without spreading across the area of the bed. As such, various embodiments described herein relate to methods, apparatuses, and systems that allow for (1) more efficient media bed cleaning, (2) increased manufacturability and improved maintenance due to decreased leg height, (3) a larger combustion chamber for heating passing gases, (4) improved gas distribution within the RTO, (5) gravity assisted valve sealing of the rotary valve, (6) reduced structural steel required in construction, (7) easier access to the heat exchange media beds, and (8) reduced manifold condensation.

In an example embodiment, a regenerative oxidizer is provided for oxidizing gas. The regenerative oxidizer may include a combustion chamber configured to heat gas present in the combustion chamber. The regenerative oxidizer may also include a first heat exchange media bed and a second heat exchange media bed. Each of the first heat exchange media bed and the second heat exchange media bed may be in fluid communication with the combustion chamber. A gas pathway may be defined by a flow of gas through the first heat exchange media bed and the second heat exchange media bed. The regenerative oxidizer may further include a rotary valve disposed at least partially between the first heat exchange media bed and the second heat exchange media bed. The rotary valve may be configured to alternate the flow of gas between a first airflow direction along the gas pathway and a second airflow direction along the gas pathway. The first airflow direction may be defined in an instance in which an inlet feed of gas is provided to the first heat exchange media bed and the second airflow direction may be defined in an instance in which the inlet feed of gas is provided to the second heat exchange media bed. The first heat exchange media bed, the rotary valve, and the second heat exchange media bed are arranged with respect to each other such that the gas pathway between the first heat exchange media bed and the rotary valve and between the second heat exchange media bed and the rotary valve is non-linear.

In some embodiments, the regenerative oxidizer may also include a wash water drain configured to receive wash water. In some embodiments, the wash water drain is positioned such that, in an instance in which wash water is supplied to at least one of the first heat exchange media bed or the second heat exchange media bed, the wash water drain is configured to allow wash water to exit the regenerative oxidizer without passing through the rotary valve.

In some embodiments, the regenerative oxidizer may also include a manifold. In such an embodiment, the manifold may include the inlet feed of gas and an outlet feed of gas, and the manifold may be configured to supply the inlet feed of gas and the outlet feed of gas to the rotary valve. In some embodiments, the manifold is positioned between the first heat exchange media bed and the second heat exchange media bed. In some embodiments, the regenerative oxidizer also includes a plurality of legs. In such an embodiment, each of the plurality of legs defines a leg height and the manifold defines a manifold height, and the leg height of the plurality of legs may be less than the manifold height.

In some embodiments, the first heat exchange media bed and the second heat exchange media bed may include ceramic. In some embodiments, the combustion chamber may further include one or more burners configured to heat the gas present in the combustion chamber. In some embodiments, the regenerative oxidizer may also include a drive motor. In such an embodiment, the drive motor may be configured to rotate the rotary valve to alter the flow of gas between the first airflow direction along the gas pathway and the second airflow direction along the gas pathway. In some embodiments, the drive motor is configured to rotate the rotary valve at a set interval of time. In some embodiments, the thermal oxidizer is a regenerative thermal oxidizer or a regenerative catalytic oxidizer. In some embodiments, the flow of gas defines a flow velocity at a given instance along the gas pathway. In such embodiments, the flow velocity entering the first heat exchange media bed in the first airflow direction is substantially less than the flow velocity of the inlet feed of gas passing through the rotary valve and the flow velocity entering the second heat exchange media bed in the second airflow direction is substantially less than the flow velocity of the inlet feed of gas passing through the rotary valve.

In another example embodiment, a method of manufacturing a regenerative oxidizer for oxidizing gas is provided. The method may include providing a combustion chamber configured to heat gas present in the combustion chamber. The method may also include positioning a first heat exchange media bed and a second heat exchange media bed. Each of the first heat exchange media bed and the second heat exchange media bed may be in fluid communication with the combustion chamber. A gas pathway may be defined by a flow of gas through the first heat exchange media bed and the second heat exchange media bed. The method may further include disposing a rotary valve at least partially between the first heat exchange media bed and the second heat exchange media bed, wherein the rotary valve is configured to alternate the flow of gas between a first airflow direction along the gas pathway and a second airflow direction along the gas pathway. The first airflow direction may be defined in an instance in which an inlet feed of gas is provided to the first heat exchange media bed, and the second airflow direction may be defined in an instance in which the inlet feed of gas is provided to the second heat exchange media bed. The first heat exchange media bed, the rotary valve, and the second heat exchange media bed are arranged with respect to each other such that the gas pathway between the first heat exchange media bed and the rotary valve and between the second heat exchange media bed and the rotary valve is non-linear.

In some embodiments, the method may also include positioning a wash water drain configured to receive wash water. In some embodiments, the wash water drain is positioned such that, in an instance in which wash water is supplied to at least one of the first heat exchange media bed or the second heat exchange media bed, the wash water drain is configured to allow wash water to exit the regenerative oxidizer without passing through the rotary valve.

In some embodiments, the method may also include positioning a manifold. In such an embodiment, the manifold may include the inlet feed of gas and an outlet feed of gas, and the manifold may be configured to supply the inlet feed of gas and the outlet feed of gas to the rotary valve. In some embodiments, the manifold is positioned between the first heat exchange media bed and the second heat exchange media bed. In some embodiments, the method also includes providing a plurality of legs. In such an embodiment, each of the plurality of legs defines a leg height and the manifold defines a manifold height, and the leg height of the plurality of legs may be less than the manifold height.

In some embodiments, the first heat exchange media bed and the second heat exchange media bed may include ceramic. In some embodiments, the method may also include disposing one or more burners within the combustion chamber configured to heat the gas present in the combustion chamber. In some embodiments, the method also includes providing a drive motor. In such an embodiment, the drive motor is configured to rotate the rotary valve to alter the flow of gas between the first airflow direction along the gas pathway and the second airflow direction along the gas pathway. In some embodiments, the drive motor is configured to rotate the rotary valve at a set interval of time. In some embodiments, the thermal oxidizer is a regenerative thermal oxidizer or a regenerative catalytic oxidizer. In some embodiments, the flow of gas defines a flow velocity at a given instance along the gas pathway. In such embodiments, the flow velocity entering the first heat exchange media bed in the first airflow direction is substantially less than the flow velocity of the inlet feed of gas passing through the rotary valve and the flow velocity entering the second heat exchange media bed in the second airflow direction is substantially less than the flow velocity of the inlet feed of gas passing through the rotary valve.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1:
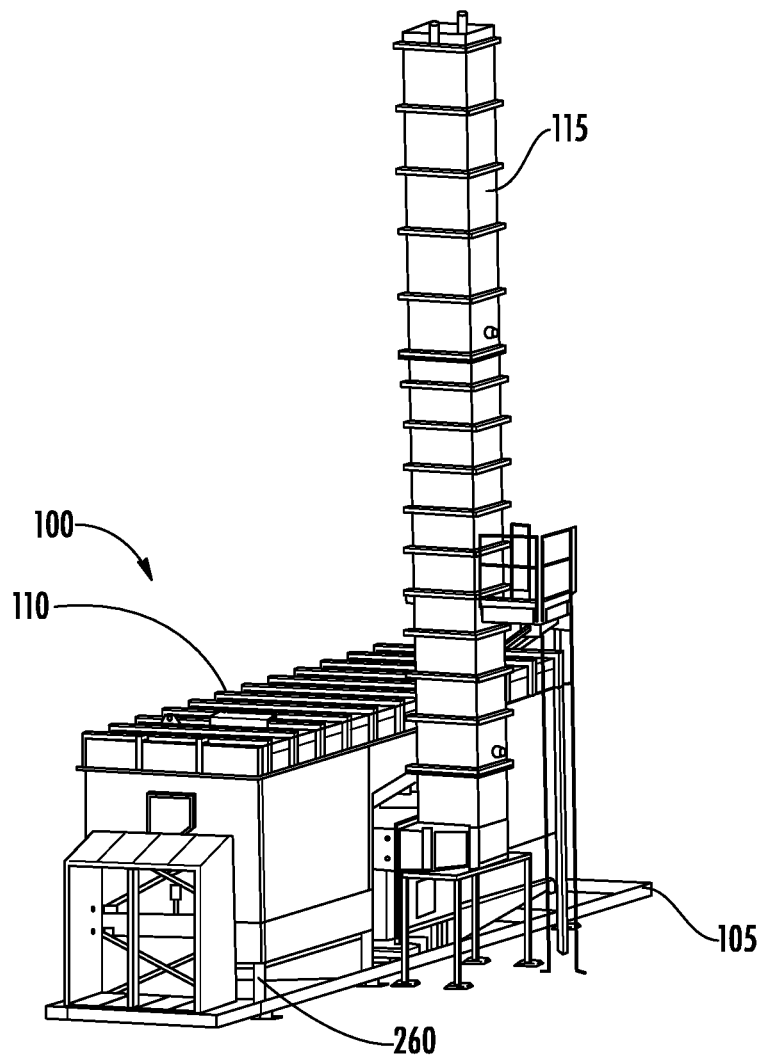
FIG. 1 illustrates a perspective exterior view of a two-can regenerative thermal oxidizer (RTO) in accordance with an example embodiment of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The components illustrated in the figures represent components that may or may not be present in various embodiments of the invention described herein such that embodiments may include fewer or more components than those shown in the figures while not departing from the scope of the invention. Some components may be omitted from one or more figures or shown in dashed line for visibility of the underlying components.

The phrases "in an example embodiment," "some embodiments," "various embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that specific component or feature is not required to be included or to have the characteristic. Such component or feature may be optionally included in some embodiments, or it may be excluded. Through the present disclosure, the terms air and gas may be used interchangeably unless otherwise stated. Furthermore, as would be evident to one of ordinary skill in the art in light of the present disclosure, the terms "substantially" and "approximately" indicate that the referenced element or associated description is accurate to within applicable engineering tolerances. While various embodiments of the present disclosure discuss a regenerative thermal oxidizer, unless explicitly stated otherwise various other regenerative oxidizers, such as a regenerative catalytic oxidizer, may use the various features discussed herein.

Regenerative Thermal Oxidizers (RTOs) are used in various operations, including manufacturing, to eliminate pollutants, such as volatile organic compounds (VOCs), hazardous air pollutants (HAPs), and odors, in gases before releasing the gases into the atmosphere. In order to do this, gases within the RTOs are heated to a sufficient temperature for the pollutants to be oxidized and be destroyed by turning the pollutants into water and carbon dioxide. Heating the gas to a sufficient temperature to oxidize the pollutants (e.g., over 1500 degrees Fahrenheit), may require a substantial amount of energy. RTOs, therefore, are used to conserve energy by transferring heat to the gas at various points during operation to minimize heat lost by the system (e.g., to maximize heat within the system). To do this, RTOs may employ heat exchange elements of various shapes, materials and configurations and alternating gas flow through the RTO to conserve energy within the system.

Traditional attempts at increasing the efficiency of an RTO (e.g., maximizing pollutant destruction and minimizing energy consumption) are directed to employing additional heat exchange media bed designs. The use of multiple heat exchange media beds (cans), however, often results in an increased manufacturing and operating cost and requires more space than a traditional two-can RTO. As such, the embodiments of the present disclosure are directed to two-can arrangements with improved efficiency without the need for additional cans. As described hereafter, the embodiments of the present disclosure allow for (1) more efficient media bed cleaning, (2) increased manufacturability and improved maintenance due to decreased leg height, (3) a larger combustion chamber for heating passing gases, (4) improved gas distribution within the RTO, (5) gravity assisted valve sealing of the rotary valve, (6) reduced structural steel required in construction, (7) easier access to the heat exchange media beds, and (8) reduced manifold condensation.

With reference to FIG. 1, a two-can RTO 100 supported on a frame 105 is provided in accordance with an example embodiment of the present disclosure. In various embodiments, the RTO 100 may include a housing 110 configured to contain a first heat exchange media bed 205 and a second heat exchange media bed 210 positioned at opposite ends of a combustion chamber 265 (shown in FIG. 3). In various embodiments, the housing 110 may be supported by two (2) or more legs 260. For example, the housing 110 may be supported by four (4) legs 260. In some embodiments, each of the two or more of legs 260 may have a leg height defined as the distance along the leg from the ground to the housing 110. In some embodiments, each of the legs 260 may have the same leg height. Alternatively, one or more of the legs 260 may have a different leg height than another leg. For example, one or more of the legs 260 may have a different leg height in order for the housing 110 to be level (e.g., relative to the ground). As described in more detail below, the RTO 100 may include a manifold 200. In some embodiments, the manifold height is less than the leg height of at least one of the two or more legs 260. In some embodiments, the two or more legs 260 may have a leg height greater than the height of the heat exchange media plenums. While described and illustrated herein with two or more legs (e.g., four (4) legs), the present disclosure contemplates that the two-can RTO 100 may include any number of legs or support structures based upon the intended application.

The RTO may include one or more burners 240 (shown in FIGS. 2-3A) that may be positioned within the combustion chamber 265, and a combustion blower supported on the frame 105 to supply combustion gas to the one or more burners. As shown, a processed gas discharge stack 115 may be attached to the manifold 200 discussed herein. The processed gas stack 115 may form some or all of the processed gas outlet feed discussed herein. Said differently, the processed gas outlet feed of the present application may be formed of any number of sections, components, or the like.

Figure 2:
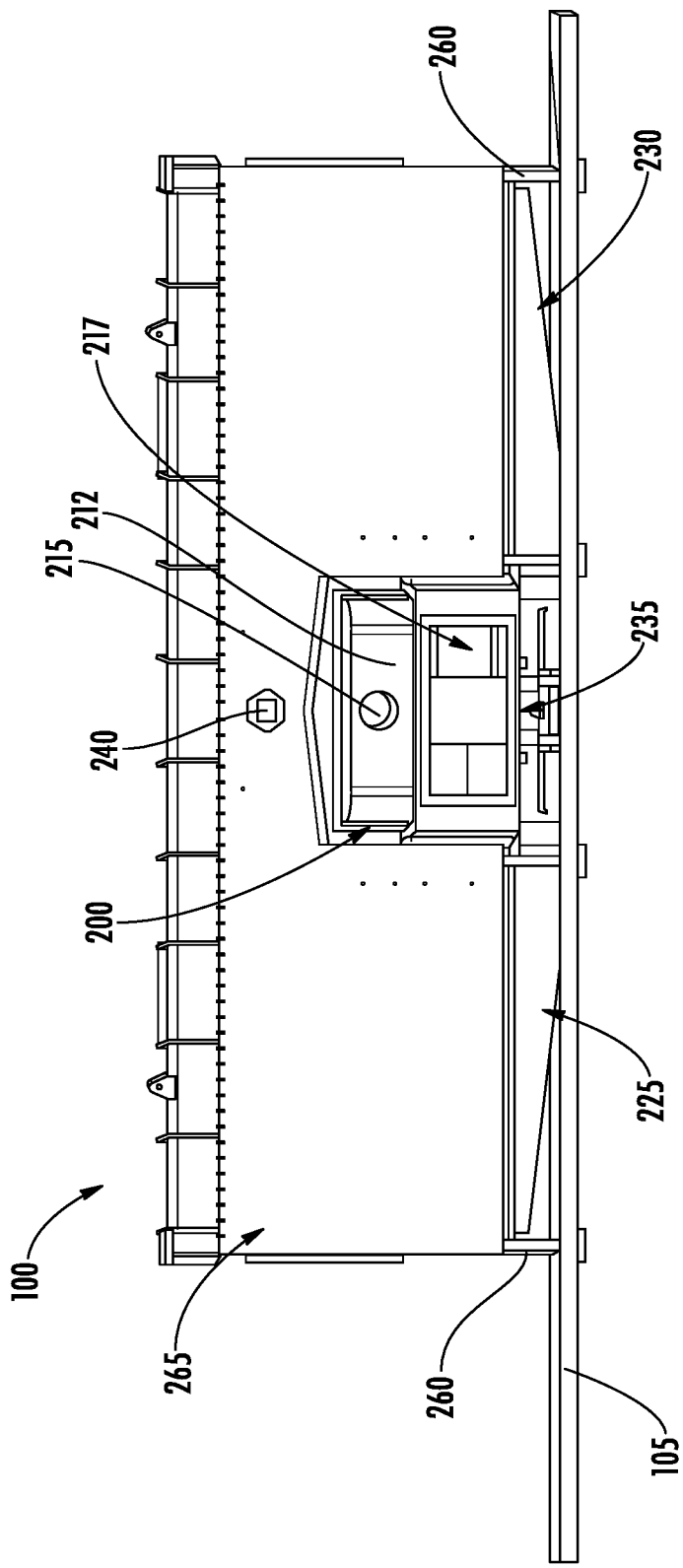
FIG. 2 illustrates a side view of the two-can regenerative thermal oxidizer (RTO) of FIG. 1 in accordance with an example embodiment of the present disclosure.

As an example, the two-can RTO 100 of FIG. 1, with reference to the elements illustrated in FIG. 2, employs two heat exchange media beds 205, 210 positioned at opposite ends of a combustion chamber 265. Once the heat exchange media beds 205, 210 are initially heated up, the gas flows through the heat exchange media bed with the higher relative temperature (e.g., the first heat exchange media bed 205), and the heat from the heat exchange media bed transfers into the gas causing the gas to be heated before the gas enters the combustion chamber 265. For example, the gas may be heated to approximately 1400 to 1475 degrees Fahrenheit within the given heat exchange media bed. Once in the combustion chamber 265, the gas is heated, by one or more burners 240 and/or the combustion of other pollutants, to a temperature of approximately 1500 to approximately 1750 degrees Fahrenheit, at which point the pollutants oxidize and are destroyed. After travelling through the combustion chamber 265, the gas enters the other heat exchange media bed (e.g., the second heat exchange media bed 210), where the heat in the gas is transferred into the heat exchange media bed conserving most of the heat within the system.

In some embodiments, the gas exiting the system may be 50-100 degrees above the temperature of the unprocessed gas entering the RTO 100. In some embodiments, the alternation of the airflow direction through the RTO 100 allows for the RTO 100 to be self-sustaining with only minimal energy consumption by the burner(s) 240 in the combustion chamber 265. In some embodiments, only the initial heating requires energy consumption by the system, such that the RTO 100 may be configured for continuous operation with minimal interruptions. In such embodiments, the components of an RTO 100 may need to be functional for extended periods of time without cooling (e.g., powering off).

During operation, the heat exchange media beds 205, 210 may accumulate materials that do not completely burn away even in the high temperatures of the RTO 100. As such, the RTO 100 may require periodic cleaning in order to avoid inefficiency and/or prevent increases in pressure drops through the heat exchange media beds (e.g. plugging the passages of gas flows through a heat exchange media bed). In order to clean out residual materials in the heat exchange media beds, water 255 or other cleaning liquid may be supplied through the heat exchange media beds 205, 210 to remove any residual material during a period of time the RTO 100 is not operating. In some embodiments, the rotary valve 235 may be positioned to allow for the wash water 255 to travel through the heat exchange media beds 205, 210 and out of the wash drain(s) 245 (shown in FIGS. 3A-3B) without having to pass through the rotary valve 235. In this way, the embodiments of the present application avoid passing water 255 through the rotary valve in order to reach the drain. As such, the embodiments of the present application avoid accumulation of inorganic materials in the sealing components of the rotary valve. In various embodiments, the positioning of the rotary valve in the RTO 100 may allow for improved access to the heat exchange media beds (e.g., without going through the valve) and improved removal of cleaning liquid from the RTO 100 (e.g., without passing through the valve).

In various embodiments, positioning of the rotary valve 235 at least partially between the first heat exchange media bed 205 and the second heat exchange media bed 210 allows for a reduction in the leg height of the legs 260 as described below. This reduced height allows for more convenient over the road shipping of the fabricated RTO 100. For example, a leg 260 may be short enough to be manufactured and transported as one piece allowing for easier and faster installation on the RTO 100. In various embodiments, positioning of the manifold 200 between the first heat exchange media bed 205 and the second heat exchange media bed 210 allows for the size of the combustion chamber 265 positioned between the heat exchange media beds to be increased. Such an increase in the combustion chamber 265 size may increase the length of the gas pathway that is within the combustion chamber 265 and, therefore, may allow for more complete oxidation of pollutants in the gas passing through the combustion chamber 265. The reduction in the leg height of the legs 260 may allow for easier transportation (e.g., shipping complete RTOs), easier loading and unloading of the heat exchange media beds, and/or a reduction in construction materials (e.g., a reduction in structural steel).

Figure 3A:
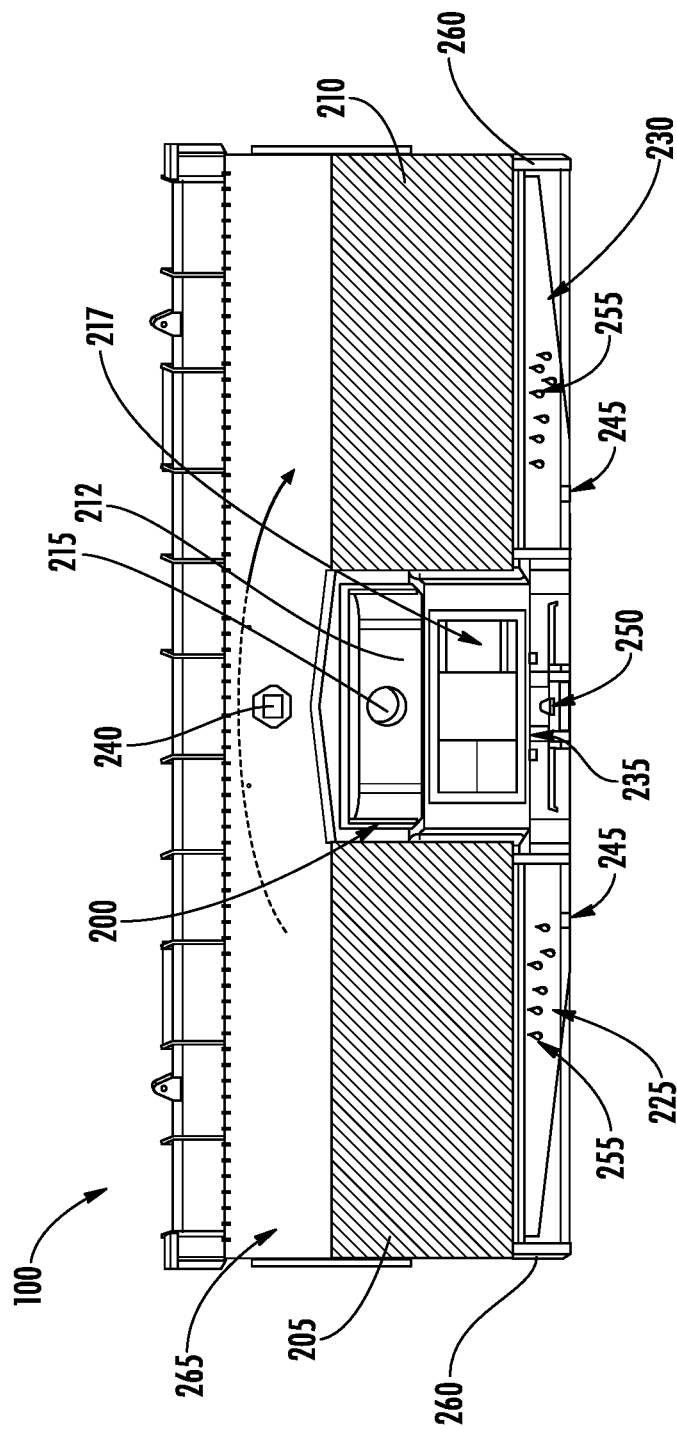
FIG. 3A illustrates a cross-section view of the two-can regenerative thermal oxidizer (RTO) of FIGS. 1-2 in accordance with an example embodiment of the present disclosure.

With reference to FIGS. 2 and 3A, a side view of the exterior (FIG. 2) and a cross-section (FIG. 3A) of an RTO 100 are provided in accordance with example embodiments of the present disclosure. As shown, the manifold 200 may be positioned between the first heat exchange media bed 205 and the second heat exchange media bed 210. In some embodiments, the manifold 200 may be positioned below at least a portion of the combustion chamber 265. In some embodiments, the manifold 200 may define a plurality of compartments. For example, the manifold 200 may define an unprocessed gas compartment 217 for facilitating the transfer of the unprocessed gas (e.g., dirty, containing one or more pollutants, or the like) into the RTO 100 and a processed gas compartment 212 for facilitating the transfer of the processed gas out of the RTO 100. In such an embodiment, the unprocessed gas inlet feed 215 may be connected to (e.g., in fluid communication with) the unprocessed gas compartment 217, and the processed gas outlet feed may be connected to (e.g., in fluid communication with) the processed gas compartment 212. In various embodiments, the term unprocessed gas refers only to gas that enters an RTO and is not a statement as to the level of pollutants in the unprocessed gas. For example, the unprocessed gas may have been previously processed by an RTO or pollution control system before entering the RTO 100. Additionally, the term processed gas refers to gas that exits the RTO after traveling through and exiting the RTO and is also not a statement as to the level of pollutants remaining in the gas, which may or may not undergo additional processing downstream.

In various embodiments, the positioned of the manifold 200 at least partially between the first heat exchange media bed 205 and the second heat exchange media bed 210 may allow the manifold to be heated during operation, thereby reducing condensation in the manifold 200. In some embodiments, the manifold 200 may include a rotary valve 235 positioned at an end of the manifold 200 at least partially between the manifold 200 and each of a first heat exchange media bed plenum 225 and a second heat exchange media bed plenum 230. In an example embodiment, the rotary valve 235 may be configured to alternate between a first airflow direction and a second airflow direction. The first airflow direction may refer to an instance in which unprocessed gas is supplied to the first heat exchange media bed plenum 225 (e.g., from the unprocessed gas inlet feed 215 and/or unprocessed gas compartment 217) and processed gas is fed from the second heat exchange media bed plenum 230 (e.g., into the processed gas outlet feed and/or the processed gas compartment 217). The second airflow direction may refer to an instance in which unprocessed gas is supplied to the second heat exchange media bed plenum 230 (e.g., from the unprocessed gas inlet feed 215 and/or unprocessed gas compartment 217) and processed gas is fed from the first heat exchange media bed plenum 225 (e.g., into the processed gas outlet feed and/or the processed gas compartment 217).

As shown in more detail in FIG. 3A, the first heat exchange media bed plenum 225 may be connected to the first heat exchange media bed 205 at one end of the first heat exchange media bed 205, and the first heat exchange media bed 205 may be connected to the combustion chamber 265 at the opposite end of the first heat exchange media bed 205. In various embodiments, the first heat exchange media bed 205 may be made of a heat-storing material, such as ceramic, configured to store heat energy and withstand high temperatures. The first heat exchange media bed 205 may define a plurality of airflow openings configured to receive the gas flowing between the combustion chamber 265 and the first heat exchange media bed plenum 225. In some embodiments, the gas may travel through the plurality of airflow openings, such that heat is transferred between the first heat exchange media bed 205 and the gas.

In various embodiments, the combustion chamber 265 may be positioned at an end of the first heat exchange media bed 205 opposite the first heat exchange media bed plenum 225. In some embodiments, one or more burners 240 may be positioned within the combustion chamber 265. In various embodiments, the one or more burners 240 are configured to introduce additional heat into gas present in the combustion chamber 265. In some embodiments, the combustion chamber 265 may also be connected to the second heat exchange media bed 210 as described hereafter. In various embodiments, the second heat exchange media bed 210 may be configured similarly to the first heat exchange media bed 205 discussed above, wherein the second heat exchange media bed 210 may define a plurality of airflow openings for the gas flowing between the combustion chamber 265 and the second heat exchange media bed plenum 230. In various embodiments, the positioning of the manifold 200 at least partially between the heat exchange media beds may increase the size of the combustion chamber 265, such that the gas flowing through the RTO 100 may be in heated in the combustion chamber 265 longer (e.g., the path of gas flowing through the combustion chamber 265 may be increased from approximately 0.1 second to approximately 0.4 seconds).

In some embodiments, the second heat exchange media bed 210 may be connected to the second heat exchange media bed plenum 230 at an end opposite the end of the second heat exchange media bed connected to combustion chamber 265. In some embodiments, the second heat exchange media bed plenum 210 may be connected to the manifold 200, by way of the rotary value 235. In some embodiments, the manifold 200 may be in communication with an unprocessed gas inlet feed 215 and a processed gas outlet feed. In an example embodiment, the RTO 100 receives gas from the unprocessed gas inlet feed 215, circulates the gas through the RTO 100 and outputs the gas through the processed gas outlet feed.

Figure 3B:
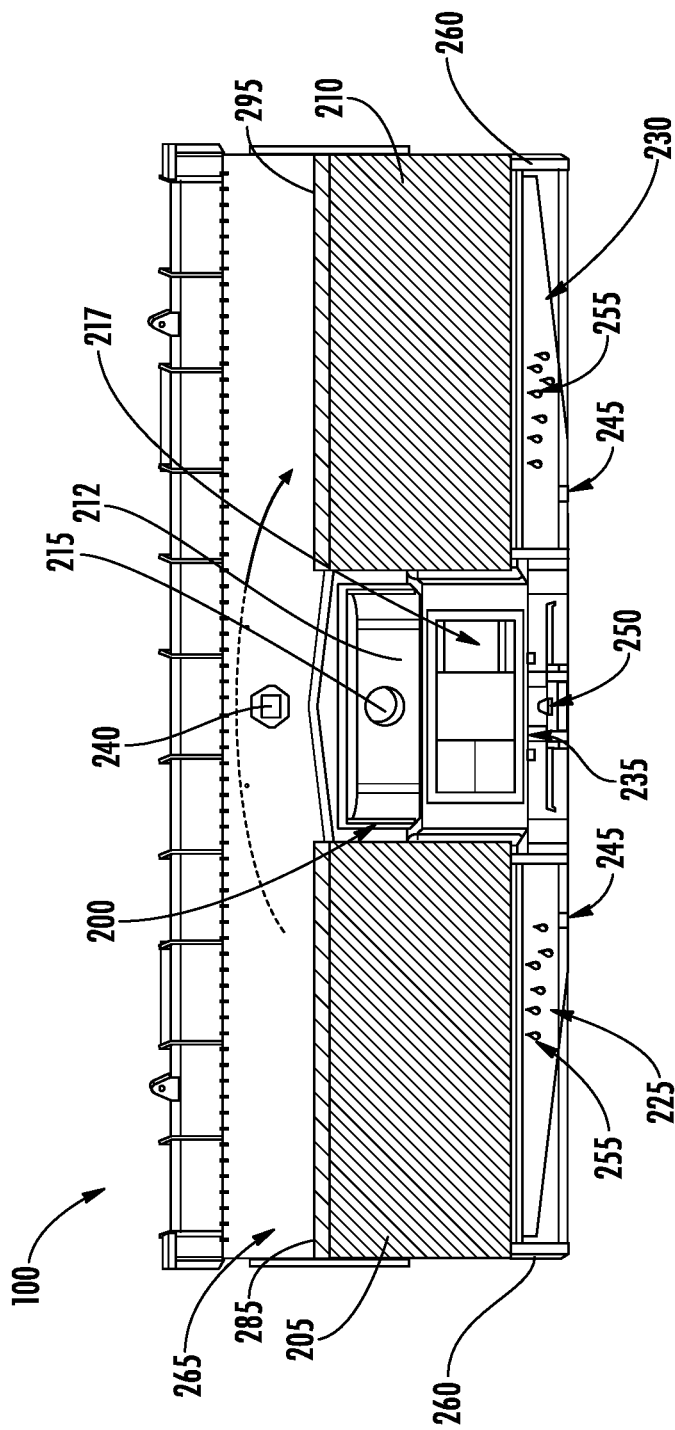
FIG. 3B illustrates a cross-section view of a two-can regenerative catalytic oxidizer in accordance with an example embodiment of the present disclosure.

In various embodiments, the regenerative oxidizer may be configured to operate as a regenerative catalytic oxidizer. As shown in FIG. 3B, each of heat exchange media bed 205, 210 may also include catalytic heat exchange media 285, 295 located as a layer at or near the top of each ceramic media bed 205, 210. In some embodiments, the catalytic heat exchange media layers 285, 295 may be relatively thin compared to the rest of the heat exchange media bed 205, 210. For example, the catalytic heat exchange media layers 285, 295 may be approximately 6 inches thick. In such an embodiment the combustion chamber 265 may operate at a significantly lower temperature than the regenerative thermal oxidizer. For example, the combustion chamber of a catalytic oxidizer may have a temperature of approximately 600 to approximately 1000 degrees Fahrenheit. In various embodiments, the outlet gas temperature of the catalytic oxidizer will be approximately 25 to approximately 40 degrees Fahrenheit above the inlet gas temperature.

In some embodiments, the positioning of the rotary valve 235 between the first heat exchange media bed 205 and the second heat exchange media bed 210 may allow for the rotating portion of the rotary valve to be sealed, at least partially, by gravity since the gases flow into and out of the rotary valve at the bottom of the manifold 200. In contrast, conventional rotary vales that are located directly below heat exchange media beds must have mechanisms that push up on the rotating parts to affect a surface to surface seal. In various embodiments, the position of the rotary valve 235 may allow for improved flow of air through the RTO.

Figure 4:
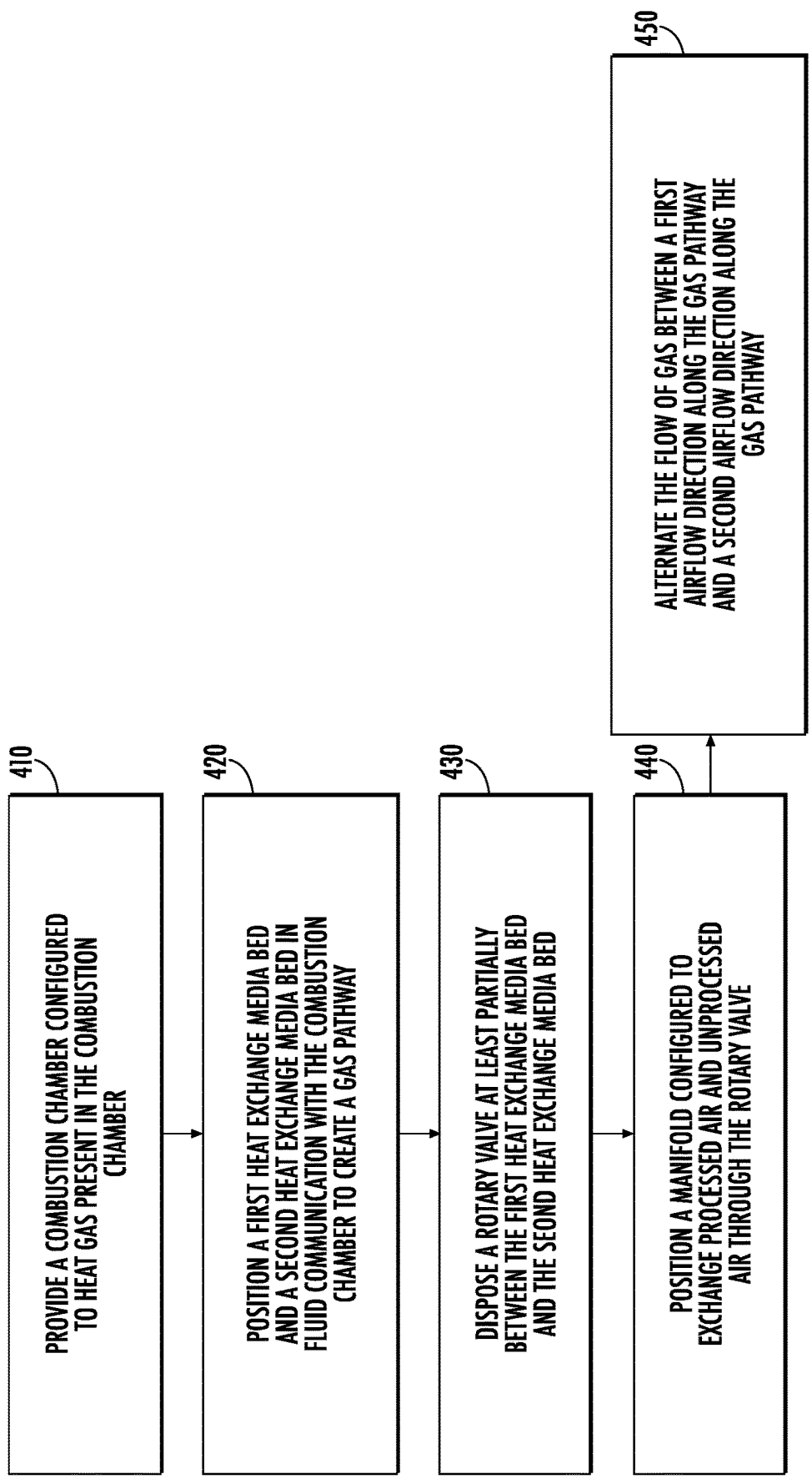
FIG. 4 illustrates a method of manufacturing an RTO in accordance with an example embodiment of the present disclosure.

Referring now to FIG. 4, a flowchart illustrating a method of manufacturing and operating a regenerative thermal oxidizer for oxidizing gas is provided in accordance with an example embodiment of the present disclosure. Unless otherwise noted, the operations described may be accomplished using various embodiments described herein.

Referring now to Block 410 of FIG. 4, the method includes providing a combustion chamber configured to heat gas present in the combustion chamber. In various embodiments, the combustion chamber 265 may be a defined compartment within the housing 110. In some embodiments, the gas present in the combustion chamber 265 is heated by one or more burners 240 and/or the combustion of pollutants in the gas passing through the combustion chamber. In an example embodiment, the gas flowing through the RTO flows into the combustion chamber 265, either from the first heat exchange media bed 205 or the second heat exchange media bed 210, at a temperature near to the combustion temperature of the pollutants in the gas. For example, the gas entering the combustion chamber 265 may be slightly below 1500 degrees Fahrenheit (e.g., 1400-1475 degrees Fahrenheit) after passing through one of the heat exchange media beds. In some embodiments, the gas may be heated in the combustion chamber 265 to between approximately 1500 and approximately 1750 degrees Fahrenheit. In some embodiments, the combustion chamber 265 may have one or more burners 240 configured to heat the gas in the combustion chamber. In some embodiments, the gas may, either additionally or alternatively, be heated by the combustion of other pollutants in the combustion chamber 265. For example, in an example embodiment in which the gas has a sufficient amount of pollutants, the combustion of the pollutants may in turn generate heat (e.g., through the resulting chemical reactions) that is sufficient to heat the gas to the sufficient temperature without having to operate the burner(s) 240. Said differently, the energy generated by the combustion of pollutants may operate to maintain the necessary temperature within the RTO 100. In an example embodiment in which the burner(s) 240 are not required, the RTO system may be self-sufficient or require minimal external energy supplied during operation. For example, in an instance in which the gas passing through the RTO 100 has sufficient pollutants, the burner(s) 240 may be used to initially heat the gas to a combustion temperature of the pollutants, at which point the combustion of the pollutants in the gas passing through the combustion chamber produces sufficient heat to heat the subsequent gas entering the combustion chamber 265 to the combustion temperature (e.g., without supplemental heat supplied by the burner(s) 240). In various embodiments, the increased size of the combustion chamber 265 may allow for the heat within the combustion chamber 265 to be more evenly distributed during operation.

Referring now to Block 420 of FIG. 4, the method includes positioning a first heat exchange media bed 205 and a second heat exchange media bed 210 in fluid communication with the combustion chamber 265 to create a gas pathway. In some embodiments, the gas pathway may be defined by a flow of gas between the first heat exchange media bed 205, the second heat exchange media bed 210, and the combustion chamber 265. As discussed above in reference to FIGS. 2-3B, the combustion chamber 265 is connected to (e.g., in fluid communication with) both the first heat exchange media bed 205 and the second heat exchange media bed 210. As such, the gas in the RTO flows through the gas pathway in either the first airflow direction (e.g., from the first heat exchange media bed 205 into the combustion chamber 265) or the second airflow direction (e.g., from the second heat exchange media bed 210 into the combustion chamber 265). In some embodiments, the connections between the heat exchange media beds 205, 210 and the combustion chamber 265 may be air-tight. As described above, by increasing the potential size of the combustion chamber 265 (while maintain the overall size of the RTO 100), the gas pathway may be similarly increased so as to provide increased heat transfer amongst the gas within the combustion chamber 265.

Referring now to Block 430 of FIG. 4, the method includes disposing a rotary valve at least partially between the first heat exchange media bed and the second heat exchange media bed. In some embodiments, the first airflow direction 265 may be defined in an instance in which an inlet feed of gas is provided to the first heat exchange media bed 205, and the second airflow direction 275 may be defined in an instance in which the inlet feed of gas is provided to the second heat exchange media bed 210. As discussed above, the rotary valve 235 may be connected to the first heat exchange media bed 205 through the first heat exchange media bed plenum 225 and to the second heat exchange media bed 210 through the second heat exchange media bed plenum 230. In various embodiments, one or more wash drains may be defined in the first heat exchange media bed plenum 225 and/or the second heat exchange media bed plenum 230. In an example embodiment, in order to clean one or more of the heat exchange media beds, water 255 or other cleaning liquids are supplied to the respective heat exchange media bed 205, 210 and then flows through the respective heat exchange media bed plenum 225, 230. In various embodiments, the wash drain 245 may be configured such that the water 255 flows out of the drain without interacting with (e.g., contacting or travelling through) the rotary valve 235. In various embodiments, the positioning of the rotary valve 235 may allow for access to the heat exchange media beds 205, 210 without passing through the rotary valve 235. Additionally, as described herein, the rotary valve 235 may be positioned to allow for gravity sealing as opposed to the complicated valve lifting systems of conventional designs.

Referring now to Block 440 of FIG. 4, the method includes positioning a manifold configured to exchange processed gas and unprocessed gas through the rotary valve. In various embodiments, as described above with reference to FIGS. 2 and 3A, the manifold 200 may be positioned between the first heat exchange media bed 205 and the second heat exchange media bed 210. In some embodiments, the manifold 200 is configured such that the rotation of the rotary valve 235 (e.g., as caused by the drive motor 250 shown in FIG. 3A), alternates between providing the unprocessed gas inlet feed to the first heat exchange media plenum 225 and providing the unprocessed gas inlet feed to the second heat exchange media plenum 230. In some embodiments, as described above, the unprocessed gas inlet feed 215 may be connected to an unprocessed gas compartment 217 of the manifold 200, and the processed gas outlet feed may be connected to a processed gas compartment 212 of the manifold 200. In various embodiments, the position of the manifold 200 at least partially between the heat exchange media beds 205, 210 may allow for a reduction in condensation within the manifold 200 (e.g., the manifold 200 is at least partially heated by the heat exchange media beds 205, 210). By positioning the manifold 200 at least partially between the heat exchange media beds 205, 210, the RTO 100 allows for a reduction in the leg height of the legs 260. This reduction in leg height may operate to increase the manufacturability of the RTO 100 as compared to conventional designs.

Referring now to Block 450 of FIG. 4, the method includes alternating the flow of gas between a first airflow direction along the gas pathway and a second airflow direction along the gas pathway. In various embodiments, the RTO 100 is continuously operated in order to conserve energy. As the gas enters the system (e.g., through the unprocessed gas inlet feed 215) during operation, the heat exchange media bed that first receives the inputted gas slowly loses heat to the gas (i.e., heat is transferred from the heat exchange media bed to the gas), while the other heat exchange media bed receives heat from the gas (i.e., heat is transferred from the gas to the heat exchange media bed). In such an embodiment, in order for the system to operate effectively, the airflow may be alternated as described hereafter with reference to FIGS. 5-6B below. In various embodiments, the position of the rotary valve 235 may allow for the gas entering the RTO 100 to be directed initially away from the heat exchange media beds 205, 210 so as to allow for improved flow distribution.

Figure 5:
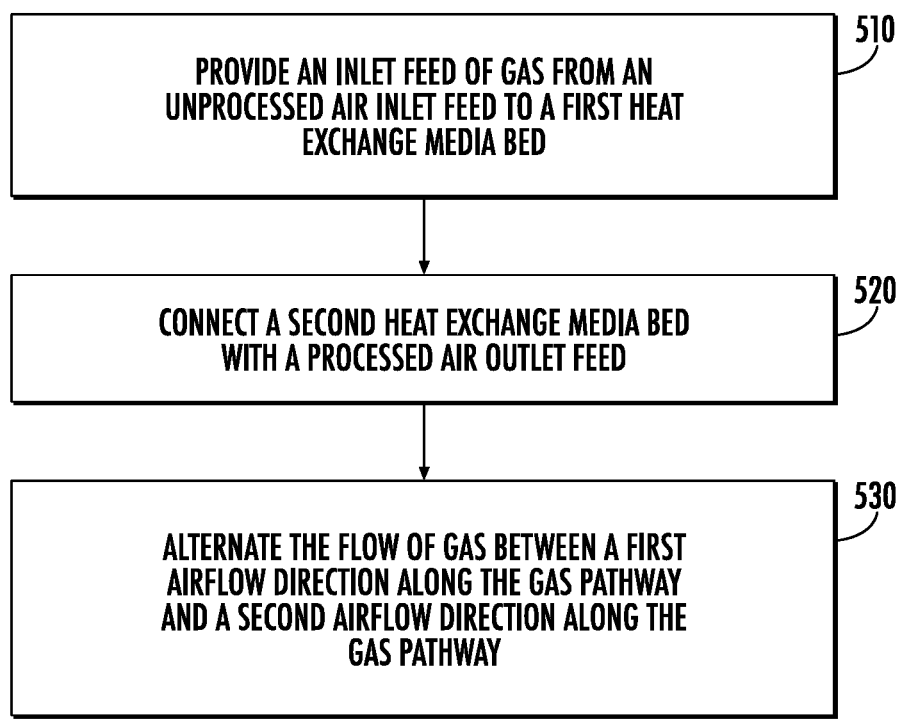
FIG. 5 illustrates a method of operation for an RTO in accordance with an example embodiment of the present disclosure.
Figure 6A:
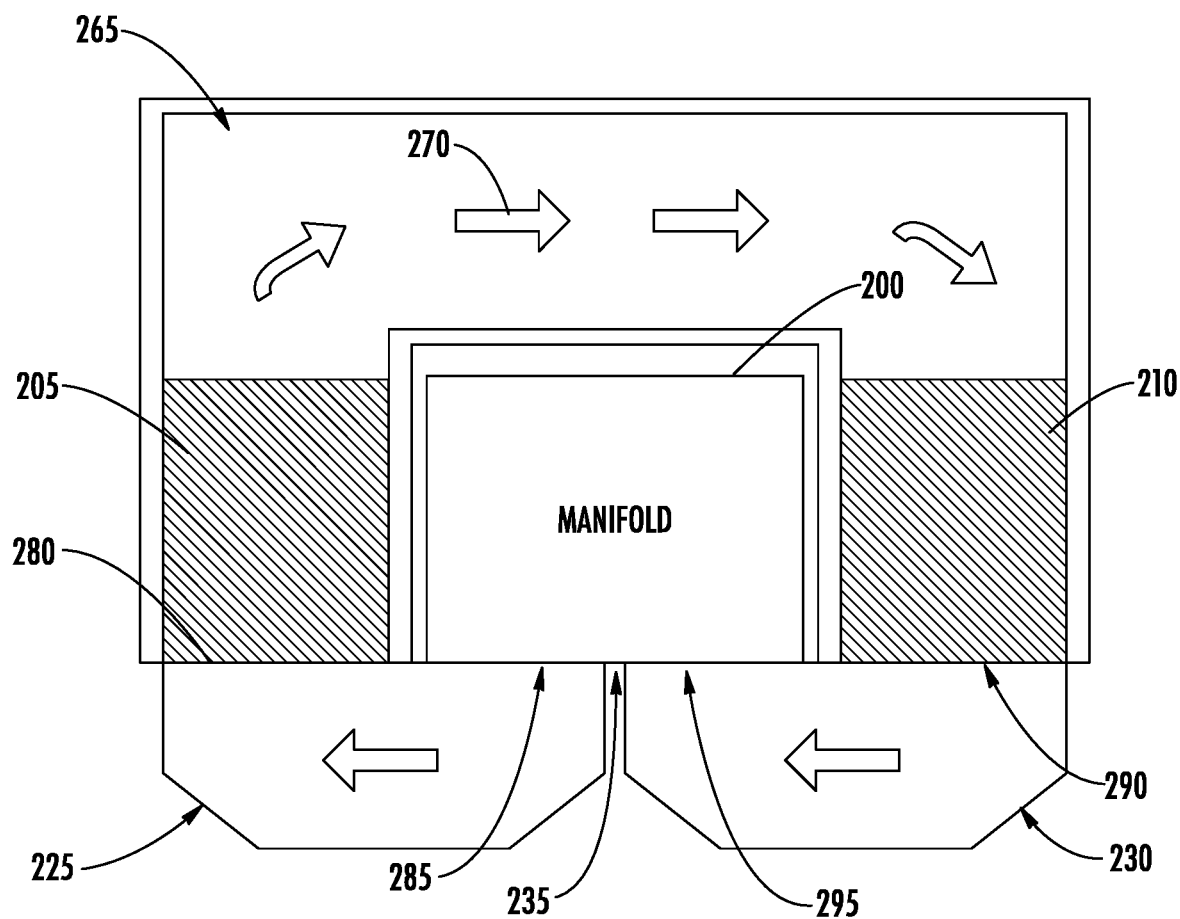
FIGS. 6A-6B are simplified cross-sectional views of an RTO showing a first airflow direction and a second airflow direction in accordance with an example embodiment of the present disclosure.
Figure 6B:
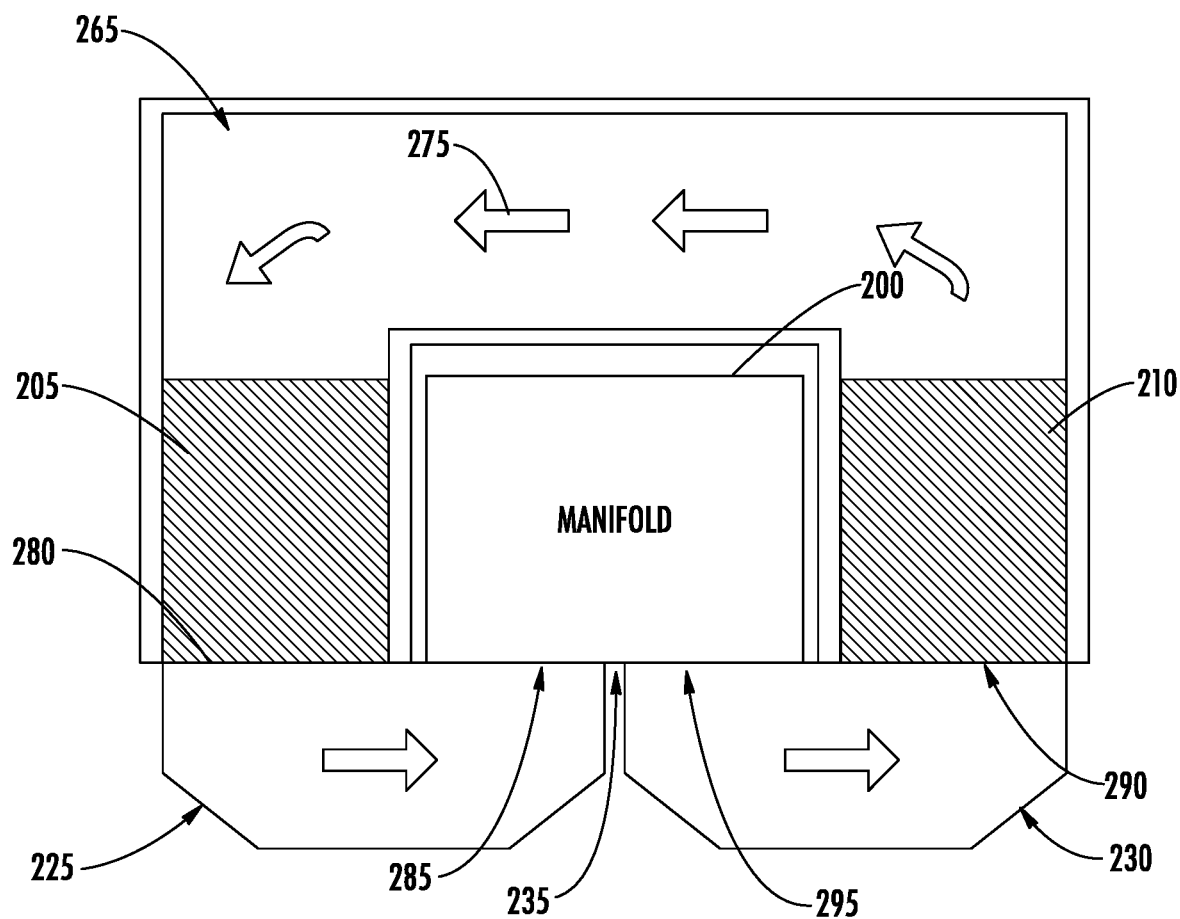

Referring now to FIG. 5, a flowchart illustrating a method of operation of an RTO is provided in accordance with an example embodiment of the present disclosure. Unless otherwise noted, the operations described may be accomplished using various embodiments described herein. FIGS. 6A and 6B are referenced during the description of FIG. 5 and illustrate a cross-sectional diagram of a simplified RTO configured with an airflow in a first direction (FIG. 6A) and then subsequently in a second airflow direction (FIG. 6B) Referring now to Block 510 of FIG. 5, the method includes providing an inlet feed of gas from an unprocessed gas inlet feed 215 to a first heat exchange media bed 205. As shown in FIG. 6A, the first heat exchange media bed plenum 225 is connected at a first end 280 to the first heat exchange media bed 205 and at a second end 285 to the manifold 200. In some embodiments, the first heat exchange media bed plenum 225 is configured to redirect the flow of gas between the first heat exchange media bed 205 and the manifold 200. In some embodiments, as discussed above, the manifold 200 may be in communication with both the unprocessed gas inlet feed 215 and the processed gas outlet feed (not shown). Additionally, the manifold 200 may be positioned at least partially between the heat exchange media beds. The gas that flows from the unprocessed gas inlet feed 215 may travel along the gas pathway along the first airflow direction 270 from the first heat exchange media bed plenum 225 through first heat exchange media bed 205 before entering the combustion chamber 265 and may then flow through the second heat exchange media bed 210 and the second heat exchange media bed plenum 230.

In various embodiments, the gas pathway defined between the rotary valve 235 and each of the heat exchange media beds 205, 210 (e.g., from the valve through each of the heat exchange media bed plenum 225, 230) may define a non-linear pathway. For example, in such embodiments, the gas passing through the manifold experiences a change of direction between the rotary valve 325 and each of the heat exchange media beds 205, 210). In a first airflow direction, for example, the gas may enter and pass generally downward through the rotary valve 235 before ultimately entering the first heat exchange media bed 205 in the generally upward direction. As a result of the non-linear gas flow, in various embodiments, the flow velocity of the gas at the unprocessed gas inlet feed 215 may be substantially greater than the flow velocity of the gas entering the given heat exchange media bed (e.g., the first heat exchange bed 205 in the first airflow direction or the second heat exchange media bed 210 in the second airflow direction). For example, the flow velocity of the gas entering the manifold 200 (e.g., from the unprocessed gas inlet feed 215) may be approximately 4000 feet per minute, the flow velocity within the given heat exchange media bed plenum may be decreased (e.g., may have a flow velocity of approximately 2000 feet per minute), and the flow velocity entering the given heat exchange media bed may be even lower (e.g., may have a flow velocity of approximately 300 feet per minute). Additionally, in various embodiments, the flow velocity at the processed gas outlet feed may be substantially greater than the flow velocity of the gas leaving the given heat exchange media bed (e.g., the second heat exchange bed 210 in the first airflow direction or the first heat exchange media bed 205 in the second airflow direction). In various embodiments, the decreased flow velocity of the air entering and exiting the heat exchange media beds may allow for a better distribution of the gas through the heat exchange media beds, thereby reducing uneven concentration of gas in various locations along the heat exchange media beds and increasing the efficiency of the heat exchange. In addition, the flow velocity exiting the given heat exchange media bed may be approximately 300 feet per minute, the flow velocity within the given heat exchange media bed plenum may be increased (e.g., approximately 2000 feet per minute), and the flow velocity of the gas exiting the manifold 200 (e.g., at the processed gas outlet fee) may be even higher (e.g., approximately 4000 feet per minute or similar to the flow velocity at the unprocessed gas inlet feed).

Referring now to Block 520 of FIG. 5, the method includes connecting a second heat exchange media bed 210 with a processed gas outlet feed (not shown). In an example embodiment, the rotary valve 235 may be positioned such that the second heat exchange media bed plenum 230 is connected to the processed gas outlet feed (not shown). As shown in FIG. 6A, the second heat exchange media bed plenum 230 is connected at a first end 290 to the second heat exchange media bed 210 and at a second end 295 to the manifold 200. In some embodiments, in an instance in which the gas is flowing in the first airflow direction 270, the gas flows through the second heat exchange media bed 210 after being heated in the combustion chamber 265. In such an embodiment, the gas then flows into the second heat exchange media bed plenum 230 connected to the processed gas inlet feed (not shown) of the manifold 200 (e.g., the gas may flow into the processed gas compartment 212 from the second heat exchange media bed plenum 230 before exiting the RTO through the processed gas outlet feed).

Referring now to Block 530 of FIG. 5, the method includes alternating the flow of gas between a first airflow direction (e.g., FIG. 6A) along the gas pathway and a second airflow direction (e.g., FIG. 6B) along the gas pathway. As discussed herein, the rotary valve 235 is positioned at least partially between the first heat exchange media bed 205 and the second heat exchange media bed 210 and is in communication with the first heat exchange media bed plenum 225 and the second heat exchange media bed plenum 230. In an example embodiment, as the rotary valve 235 is rotated, the unprocessed gas inlet feed 215 becomes in communication with a different heat exchange media bed plenum (e.g., in an instance in which the flow of gas is alternated from the first airflow direction to the second airflow direction, the unprocessed gas inlet feed 215 is in communication with the second heat exchange media bed plenum 230). Similarly, the processed gas outlet feed (not shown) also becomes in communication with a different heat exchange media bed plenum (e.g., in an instance in which the flow of gas is alternated from the first airflow direction to the second airflow direction, the processed gas outlet feed is in communication with the first heat exchange media bed plenum 205). As shown in FIG. 6B, after the rotary valve 235 has rotated completely (e.g., the rotary valve is not blocking the flow of processed and unprocessed gas into the RTO), the gas flows in the second airflow direction 275. As described above, the second airflow direction 275 refers to an instance in which the unprocessed gas inlet feed 215 provides gas to the second heat exchange media bed plenum 230, which gas travels through the second heat exchange media bed 210, the combustion chamber 265, the first heat exchange media bed 205, and the first heat exchange media bed plenum 225 before exiting the RTO through the processed gas outlet feed. In various embodiments, the rotary valve 235 may be rotated by the valve drive motor 250. In an example embodiment, the valve drive motor 250 may rotate the rotary valve 235 in order to alter the airflow direction of the gas at regular intervals. In some embodiments, the airflow direction of the gas may be altered in intervals of approximately two (2) to four (4) minutes. For example, the airflow direction may be altered every three (3) minutes. In various embodiments, as described herein, the position of the rotary valve 235 may allow for easier manufacturing, easier maintenance and cleaning, and the elimination of complicated valve lifting systems.

In this way, the embodiments of the present disclosure improve efficiency of two-can RTO arrangements without the need for additional cans. In some embodiments, the placement of the rotary valve and manifold also allows for cleaning processes that do not require contaminated cleaning liquid to pass into the rotary valve before exiting the RTO. As described above, the embodiments of the present disclosure provide for (1) more efficient media bed cleaning, (2) increased manufacturability and improved maintenance due to decreased leg height, (3) a larger combustion chamber for heating passing gases, (4) improved gas distribution within the RTO, (5) gravity assisted valve sealing of the rotary valve, (6) reduced structural steel required in construction, (7) easier access to the heat exchange media beds, and (8) reduced manifold condensation.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

The invention claimed is:

1. A regenerative oxidizer for oxidizing gas, the regenerative oxidizer comprising:
   a combustion chamber configured to heat gas present in the combustion chamber;
   a first heat exchange media bed and a second heat exchange media bed, wherein each of the first heat exchange media bed and the second heat exchange media bed are in fluid communication with the combustion chamber,
   wherein a gas pathway is defined by a flow of gas through the first heat exchange media bed and the second heat exchange media bed;
   a manifold comprising a rotary valve defined along a bottom surface of the manifold, wherein the manifold is disposed at least partially between the first heat exchange media bed and the second heat exchange media bed, wherein the manifold comprises an inlet feed of gas and an outlet feed of gas, and wherein the manifold is configured to supply the inlet feed of gas and the outlet feed of gas to the rotary valve, wherein the rotary valve is configured to alternate the flow of gas between a first airflow direction along the gas pathway and a second airflow direction along the gas pathway, wherein the first airflow direction is defined in an instance in which the inlet feed of gas is provided to the first heat exchange media bed, and the second airflow direction is defined in an instance in which the inlet feed of gas is provided to the second heat exchange media bed, wherein the first heat exchange media bed, the rotary valve, and the second heat exchange media bed are arranged with respect to each other such that the gas pathway between the first heat exchange media bed and the rotary valve and between the second heat exchange media bed and the rotary valve is non-linear.

2. The regenerative oxidizer of claim 1, further comprising a wash water drain configured to receive wash water, wherein the wash water drain is positioned such that, in an instance in which wash water is supplied to at least one of the first heat exchange media bed or the second heat exchange media bed, the wash water drain is configured to allow wash water to exit the regenerative oxidizer without passing through the rotary valve.

3. The regenerative oxidizer of claim 1, wherein the manifold is positioned between the first heat exchange media bed and the second heat exchange media bed.

4. The regenerative oxidizer of claim 1, further comprising a plurality of legs, wherein each of the plurality of legs defines a leg height and the manifold defines a manifold height, and wherein the leg height of the plurality of legs is less than the manifold height.

5. The regenerative oxidizer of claim 1, wherein the combustion chamber further comprises one or more burners configured to heat the gas present in the combustion chamber.

6. The regenerative oxidizer of claim 1, further comprising a drive motor, wherein the drive motor is configured to rotate the rotary valve to alter the flow of gas between the first airflow direction along the gas pathway and the second airflow direction along the gas pathway.

7. The regenerative oxidizer of claim 6, wherein the drive motor is configured to rotate the rotary valve at a set interval of time.

8. The regenerative oxidizer of claim 1, wherein the thermal oxidizer is a regenerative thermal oxidizer or a regenerative catalytic oxidizer.

9. The regenerative oxidizer of claim 1, wherein the flow of gas defines a flow velocity at a given point along the gas pathway, wherein the flow velocity entering the first heat exchange media bed in the first airflow direction is substantially less than the flow velocity of the inlet feed of gas passing through the rotary valve, and wherein the flow velocity entering the second heat exchange media bed in the second airflow direction is substantially less than the flow velocity of the inlet feed of gas passing through the rotary valve.

10. A method of manufacturing a regenerative oxidizer for oxidizing gas, the method comprising:
providing a combustion chamber configured to heat gas present in the combustion chamber;
positioning a first heat exchange media bed and a second heat exchange media bed, wherein each of the first heat exchange media bed and the second heat exchange media bed are in fluid communication with the combustion chamber,
wherein a gas pathway is defined by a flow of gas through the first heat exchange media bed and the second heat exchange media bed; and
disposing a manifold comprising a rotary valve defined along a bottom surface of the manifold, wherein the manifold is disposed at least partially between the first heat exchange media bed and the second heat exchange media bed, wherein the manifold comprises an inlet feed of gas and an outlet feed of gas, and wherein the manifold is configured to supply the inlet feed of gas and the outlet feed of gas to the rotary valve, wherein the rotary valve is configured to alternate the flow of gas between a first airflow direction along the gas pathway and a second airflow direction along the gas pathway, wherein the first airflow direction is defined in an instance in which the inlet feed of gas is provided to the first heat exchange media bed, and the second airflow direction is defined in an instance in which the inlet feed of gas is provided to the second heat exchange media bed, and wherein the first heat exchange media bed, the rotary valve, and the second heat exchange media bed are arranged with respect to each other such that the gas pathway between the first heat exchange media bed and the rotary valve and between the second heat exchange media bed and the rotary valve is non-linear.

11. The method of claim 10, further comprising positioning a wash water drain configured to receive wash water, wherein the wash water drain is positioned such that, in an instance in which wash water is supplied to at least one of the first heat exchange media bed or the second heat exchange media bed, the wash water drain is configured to allow wash water to exit the regenerative oxidizer without passing through the rotary valve.

12. The method of claim 10, wherein the manifold is positioned between the first heat exchange media bed and the second heat exchange media bed.

13. The method of claim 10, further comprising providing a plurality of legs, wherein each of the plurality of legs defines a leg height and the manifold defines a manifold height, and wherein the leg height of the plurality of legs is less than the manifold height.

14. The method of claim 10, further comprising disposing one or more burners within the combustion chamber configured to heat the gas present in the combustion chamber.

15. The method of claim 10, further comprising providing a drive motor, wherein the drive motor is configured to rotate the rotary valve to alter the flow of gas between the first airflow direction along the gas pathway and the second airflow direction along the gas pathway.

16. The method of claim 15, wherein the drive motor is configured to rotate the rotary valve at a set interval of time.

17. The method of claim 10, wherein the thermal oxidizer is a regenerative thermal oxidizer or a regenerative catalytic oxidizer.

18. The method of claim 10, wherein the flow of gas defines a flow velocity at a given point along the gas pathway, wherein the flow velocity entering the first heat exchange media bed in the first airflow direction is substantially less than the flow velocity of the inlet feed of gas passing through the rotary valve, and wherein the flow velocity entering the second heat exchange media bed in the second airflow direction is substantially less than the flow velocity of the inlet feed of gas passing through the rotary valve.

* * * * *